Nov. 3, 1953 — J. CHESTLEY — 2,657,586
DRIVING AND SUPPORTING DEVICE FOR ROTATABLE MEMBERS
Filed April 3, 1952
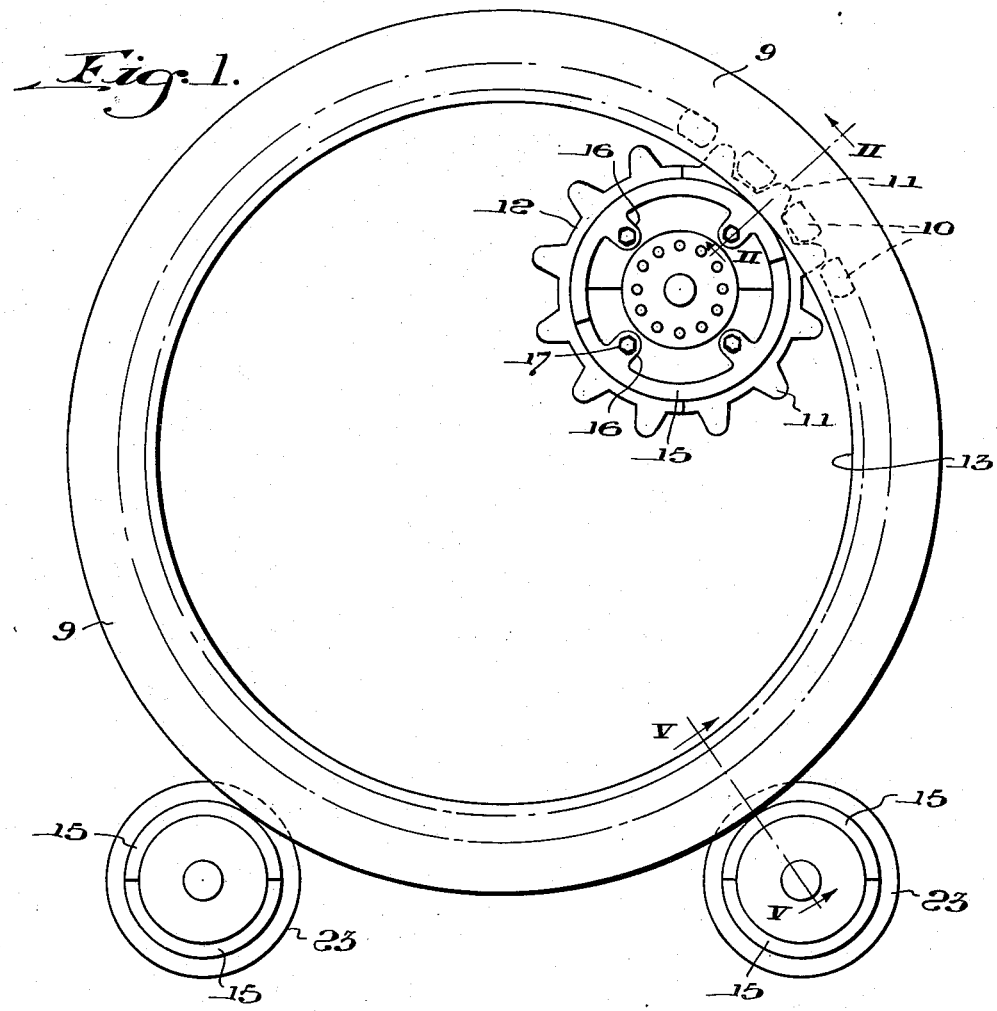
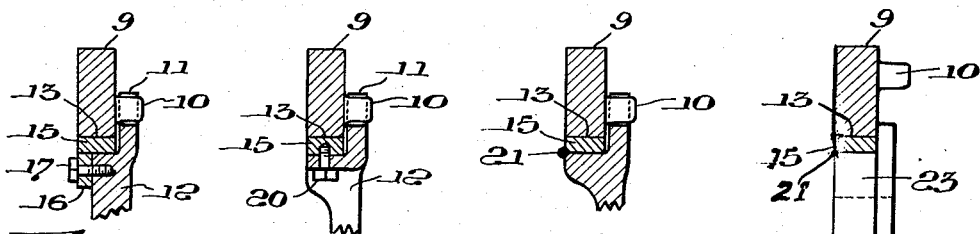
INVENTOR.
JOHN CHESTLEY.
BY Archworth Martin
his ATTORNEY.

Patented Nov. 3, 1953

2,657,586

UNITED STATES PATENT OFFICE 2,657,586

DRIVING AND SUPPORTING DEVICE FOR ROTATABLE MEMBERS

John Chestley, Volant, Pa.

Application April 3, 1952, Serial No. 280,213

6 Claims. (Cl. 74—460)

My invention relates to a gearing device that is particularly suitable for use with excavating machinery of the rotary type, mixing drums, rotary kilns, etc., where the driven member has rolling engagement with supporting flanges or other circular surfaces on sprocket wheels or with idler rollers.

The peripheral surfaces of the sprocket wheels or rollers upon which the drum rims or wheels roll become worn to such an extent that grooves or gutters are formed in these supporting surfaces, thus necessitating replacement of these worn wheels and rollers, from time to time.

One object of my invention is to provide drum-supporting and driving devices of the character referred to, wherein the rolling surfaces of the smaller supporting or driving rollers can readily be replaced without discarding the entire roller or gear wheel and without a protracted period of shut-down.

Another object of my invention is to form wear collars on such surfaces, in segments or sections, so that they can more easily be applied and will also more readily conform to slight inaccuracies of contours of the members to which they are applied.

Some of the forms which my invention may take are shown in the accompanying drawing, wherein Figure 1 is an end view of a drum or rim, in combination with my improvements; Fig. 2 is a view taken on the line II—II of Fig. 1; Fig. 3 shows a modification of the structure of Fig. 2; Fig. 4 shows still another modification thereof, and Fig. 5 is a view taken on the line V—V of Fig. 1.

The device is here shown as employed in combination with the rim member 9 of a rotatably-driven drum or wheel the rim member having teeth or studs 10 for driven engagement by the teeth 11, of a sprocket wheel 12. An annular flange on one face of the sprocket wheel supports an inner annular surface 13 of the drum or rim 9, and in time, it becomes worn. Heretofore, this flange has been made integral with the sprocket wheel, and it has been necessary to discard the whole wheel, because of the groove that becomes worn in the flange through engagement thereof with the ring 9. To overcome this objection, I place a split hardened collar 15 of two pieces around the hub or the flange of the sprocket wheel. Each of the wear collar segments 15 has wings 16 by which it is attached to the face of the sprocket wheel by screws 17. When the collar segments become worn, they can obviously be replaced. The wings or ears 16 can be formed integrally with the members 15 or be welded thereto.

As an alternative, screws 20 (Fig. 3) can be used to connect the collar members 15 to the sprocket wheel. Still another manner of removably connecting the collar members 15 is by depositing a few spots of weld metal 21 (Fig. 4) that can readily be chipped off when the rings need to be replaced.

Where flanged idler wheels are employed for supporting the rim 9 for rotative movement, such as the wheel or roller 23 of Figs. 1 and 5, collar rings 15 thereon may likewise be replaced as they become worn. The collars can, of course, be each of a single piece instead of made in half sections.

By making the wear collars in segments, they can conveniently be applied to and removed from the flange of the sprocket wheel, particularly when the sprocket wheel is not clearly exposed for convenient access. Also, the segmental arrangement permits of some unevenness in circular contours that would make more difficult the fitting of a single-piece collar into place.

I claim as my invention:

1. A sprocket wheel having a peripheral shoulder adjacent to one radial face thereof, an annular row of radially-projecting sprocket teeth adjacent to the other radial face of the wheel, and a wear collar removably connected in encircling relation to said shoulder, for rolling engagement with a rim member that has axially projecting teeth engageable with the sprocket teeth, the said shoulder and the radial sprocket teeth being respectively disposed mainly to one side of the diametral mid plane of the sprocket wheel.

2. A sprocket wheel having a shoulder positioned adjacent to one radial face of the wheel, a collar encircling the shoulder, in position to serve as a tread surface on which an annular member will roll, when driven by the sprocket wheel, the teeth of the sprocket being entirely disposed radially beyond the periphery of the collar, adjacent to the other radial face of the wheel, and means for removably securing the collar on the shoulder.

3. A sprocket wheel having a shoulder positioned adjacent to one radial face of the wheel, a collar encircling the shoulder, in position to serve as a tread surface on which an annular member will roll, when driven by the sprocket wheel, the teeth of the sprocket being entirely disposed radially beyond the periphery of the collar, adjacent to the other radial face of the wheel, and means for removably securing the collar on the shoulder, the said means comprising a wing carried by the collar and a screw for holding said wing flatwise against the adjacent face of the sprocket wheel.

4. A sprocket wheel having a shoulder positioned adjacent to one radial face of the wheel, a collar encircling the shoulder, in position to serve as a tread surface on which an annular member will roll, when driven by the sprocket wheel, the teeth of the sprocket being entirely disposed radially beyond the periphery of the collar, adjacent to the other radial face of the wheel, and means for removably securing the collar on the shoulder, the said means comprising a screw that extends outwardly through the said shoulder and has threaded engagement with the collar.

5. A sprocket wheel having a shoulder positioned adjacent to one radial face of the wheel, a collar encircling the shoulder, in position to serve as a tread surface on which an annular member will roll, when driven by the sprocket wheel, the width of the collar and the shoulder in an axial direction being greater than the thickness of the sprocket teeth in the axial direction, and means for removably securing the collar on the shoulder.

6. The combination with a peripheral rim member for rotary drums and having a circular row of teeth on a radial face thereof and disposed coaxially with the drum, of a sprocket wheel of smaller diameter than the rim and whose axis is parallel to the axial line of the rim and whose teeth extend along the said radial face of the rim, for driving engagement with the first-named teeth, the sprocket wheel having a circular shoulder extending into the rim, and a collar carried by the peripheral surface of the shoulder and having rolling engagement with the inner circular surface of the rim.

JOHN CHESTLEY.

References Cited in the file of this patent

UNITED STATES PATENTS

| Number | Name | Date |
| --- | --- | --- |
| 1,308,160 | Brinton | July 1, 1919 |
| 1,347,730 | Zeitlin | July 27, 1920 |
| 2,584,793 | De Mato | Feb. 5, 1952 |

FOREIGN PATENTS

| Number | Country | Date |
| --- | --- | --- |
| 240,016 | Germany | Jan. 12, 1910 |